(12) United States Patent
Nishi et al.

(10) Patent No.: US 10,303,897 B2
(45) Date of Patent: May 28, 2019

(54) ANONYMIZATION SYSTEM, ISSUANCE DEVICE, AND STORAGE MEDIUM

(71) Applicant: KEIO UNIVERSITY, Minato-ku, Tokyo (JP)

(72) Inventors: Hiroaki Nishi, Kanagawa (JP); Kengo Okada, Kanagawa (JP); Yuichi Nakamura, Kanagawa (JP)

(73) Assignee: KEIO UNIVERSITY, Tokyo (JP)

( * ) Notice: Subject to any disclaimer, the term of this patent is extended or adjusted under 35 U.S.C. 154(b) by 216 days.

(21) Appl. No.: 15/309,010

(22) PCT Filed: Apr. 1, 2015

(86) PCT No.: PCT/JP2015/060335
§ 371 (c)(1),
(2) Date: Nov. 4, 2016

(87) PCT Pub. No.: WO2015/170531
PCT Pub. Date: Nov. 12, 2015

(65) Prior Publication Data
US 2017/0068828 A1 Mar. 9, 2017

(30) Foreign Application Priority Data

May 8, 2014 (JP) .................................. 2014-096790

(51) Int. Cl.
*G06F 21/62* (2013.01)
*G06F 16/35* (2019.01)
*G06Q 20/38* (2012.01)

(52) U.S. Cl.
CPC .......... *G06F 21/6254* (2013.01); *G06F 16/35* (2019.01); *G06Q 20/383* (2013.01)

(58) Field of Classification Search
CPC ...... G06F 21/60; G06F 21/62; G06F 21/6254; G06Q 20/383; G06Q 30/0615; H04L 63/0421; H04L 63/0407; H04L 2209/42
(Continued)

(56) References Cited

U.S. PATENT DOCUMENTS 8,918,894 B2 * 12/2014 Miyakawa .......... G06F 21/6254
726/26
2006/0123461 A1 * 6/2006 Lunt .................... G06F 21/6254
726/1
(Continued)

FOREIGN PATENT DOCUMENTS

JP 2011244441 A 12/2011
JP 2013190838 A 9/2013
(Continued)

OTHER PUBLICATIONS

"Charu C. Aggarwal, On K-Anonymity and the curse of dimensionality", Sep. 2005, 31st international conference on very large data bases VLDB, pp. 901-909 (Year: 2005).*
(Continued)

*Primary Examiner* — Saleh Najjar
*Assistant Examiner* — Khalid M Almaghayreh
(74) *Attorney, Agent, or Firm* — Holtz, Holtz & Volek PC

(57) ABSTRACT

An anonymization system is equipped with a provisioning data manager, a provisioning rule manager, and an issuer. Upon receiving data that contains predetermined information and provisioning rules that correspond to the data and are used as conditions under which the data is anonymized, the provisioning data manager stores the data and provides the provisioning rules. The provisioning rule manager stores the provisioning rules provided by the provisioning data manager. When a request is made to issue the anonymized data, that is, the data that has been anonymized, if the
(Continued)

issuance request is in accord with the provisioning rules stored in the provisioning rule manager, the issuer acquires the data corresponding to the provisioning rules from the provisioning data manager, issues the anonymized data by anonymizing the acquired data, and provides the anonymized data.

8 Claims, 5 Drawing Sheets

(58) Field of Classification Search
USPC .................................. 705/51, 74; 726/1, 30
See application file for complete search history.

(56) References Cited

U.S. PATENT DOCUMENTS

| 2009/0254971 | A1* | 10/2009 | Herz | G06Q 10/10 |
| | | | | 726/1 |
| 2010/0130239 | A1* | 5/2010 | Shaw | H04L 51/14 |
| | | | | 455/466 |
| 2010/0241595 | A1* | 9/2010 | Felsher | G06F 19/328 |
| | | | | 705/400 |
| 2011/0271352 | A1* | 11/2011 | Kalogridis | G01D 4/02 |
| | | | | 726/26 |
| 2012/0197915 | A1* | 8/2012 | Miyakawa | G06Q 10/00 |
| | | | | 707/755 |
| 2013/0080721 | A1* | 3/2013 | Tomiyama | G06F 3/0644 |
| | | | | 711/161 |
| 2013/0239226 | A1 | 9/2013 | Miyakawa | |
| 2013/0282679 | A1* | 10/2013 | Khin | G06F 21/6254 |
| | | | | 707/698 |
| 2014/0281491 | A1* | 9/2014 | Zaverucha | H04L 9/321 |
| | | | | 713/155 |

FOREIGN PATENT DOCUMENTS

| WO | 2011142327 A1 | 11/2011 |
| WO | 2012067213 A1 | 5/2012 |

OTHER PUBLICATIONS

"Earl F. Glynn, Mixtures of Gaussians", Feb. 2007, Stowers Institute for Medical Research. (Year: 2007).*

"Khalid Emam, Fida Dankar, Protecting Privacy Using K-Anonynniy", Oct. 2008, Journal of the American Medical Informatics Association, vol. 15 No. 5. (Year: 2008).*

International Search Report (ISR) dated Jun. 30, 2015 and Written Opinion issued in International Application No. PCT/JP2015/060335.

Keiichi Hirota, et al."Implementation and Evaluation of a Personal Data Anonymization System Based on Probabilistic Security Measure", IPSJ SIG Notes Security Psychology & Trust (SPT) Sep. 9, 2014, May 8, 2014, 13 Pages.

* cited by examiner

ANONYMIZATION SYSTEM, ISSUANCE DEVICE, AND STORAGE MEDIUM

TECHNICAL FIELD

The present invention relates to an anonymization system that anonymizes and provides data containing personal information, an issuance device, and a storage medium having stored therein a program to be executed at the issuance device.

BACKGROUND ART

When information such as big data is being handled, privacy information is used. When private information is used, the information is anonymized such that individuals cannot be identified. For example, a system has been proposed that anonymizes and outputs data of numerous customers registered in a database such that the respective customers cannot be identified. This system makes a determination as to whether or not the results of anonymization are excessively anonymized (see Patent Document 1).

Patent Document 1: Japanese Unexamined Patent Application, Publication No. 2013-190838

DISCLOSURE OF THE INVENTION

However, there are no recitations in Patent Document 1 concerning losses of information and there are no recitations concerning infrastructure that utilizes the anonymized data.

Thus, although anonymization (generalization) techniques have been proposed heretofore, the provision of information, anonymization of information, and provision of anonymized data cannot be administered at the infrastructure level.

Furthermore, heretofore, when anonymization is performed multiple times on the basis of a single set of information, there is a possibility of losing anonymity.

Means for Solving the Problems

An anonymization system according to the present invention is equipped with: a provisioning data manager that receives data in which predetermined information is recorded with a provisioning rule, that stores the data, and that provides the provisioning rule, the provisioning rule corresponding to the data and being a condition for when the data is anonymized; a provisioning rule manager that stores the provisioning rule provided by the provisioning data manager; and an issuer that, when an issuance request for anonymized data in which the data is anonymized is received and if the issuance request is in accord with the provisioning rule stored at the provisioning rule manager, acquires data corresponding to the provisioning rule from the provisioning data manager, anonymizes the acquired data, issues anonymized data, and provides the anonymized data.

It is preferable if the issuer is equipped with: a request receiving section that receives the issuance request; a determining section that makes a determination as to whether a request rule corresponding to the issuance request received by the request receiving section, which request rule is to be used when the data is anonymized, corresponds with the provisioning rule stored at the provisioning rule manager; an acquiring section that, if the determining section determines that the request rule corresponds with the provisioning rule, acquires the data corresponding to the provisioning rule from the provisioning data manager; an anonymizing section that anonymizes the data acquired by the acquiring section on the basis of the request rule and issues the anonymized data; and a provisioning section that provides the anonymized data issued by the anonymizing section.

It is preferable if the anonymizing section issues the anonymized data by creating a plurality of clusters containing predetermined quantities of data on the basis of the data acquired by the acquiring section, creating respective Gaussian distributions of the plurality of clusters, and adding together the created Gaussian distributions and converting scale such that the area of the combined distribution is one.

It is preferable if the anonymization system is equipped with an issued data manager that stores the anonymized data issued by the issuer. In this case, the issuer reads the anonymized data stored at the issued data manager, further anonymizes the anonymized data, and issues doubly anonymized data.

An issuance device according to the present invention is equipped with: a request receiving section that receives an issuance request from a data user terminal; a determining section that makes a determination as to whether a request rule corresponding to the issuance request received by the request receiving section, which request rule is to be used when data is anonymized, corresponds with a provisioning rule provided from a data provider, which provisioning rule is a condition for when the data is anonymized; an acquiring section that, if the determining section determines that the request rule corresponds with the provisioning rule, acquires data corresponding to the provisioning rule; an anonymizing section that anonymizes the data acquired by the acquiring section on the basis of the request rule and issues anonymized data; and a provisioning section that provides the anonymized data issued by the anonymizing section to the data user terminal.

An issuance device according to the present invention is equipped with: a request receiving section that receives an issuance request from a data user terminal; an acquiring section that acquires, from an issued data manager, anonymized data that has been previously anonymized at a standard equivalent to a request rule corresponding to the issuance request received by the request receiving section, which request rule is to be used when data is anonymized, or anonymized data that has been previously anonymized at a lower privacy standard than the request rule; an anonymizing section that, on the basis of the request rule, further anonymizes the anonymized data acquired by the acquiring section that has been previously anonymized at the lower privacy standard than the request rule, and issues doubly anonymized data; and a provisioning section that provides the doubly anonymized data issued by the anonymizing section to the data user terminal, or provides the anonymized data acquired by the acquiring section that has been previously anonymized at the standard equivalent to the request rule to the data user terminal to serve as doubly anonymized data.

A non-transitory computer readable storage medium according to the present invention stores a program executed by a computer. The program executes: a request receiving process of receiving an issuance request from a data user terminal; a determining process of making a determination as to whether a request rule corresponding to the issuance request received in the request receiving process, which request rule is to be used when data is anonymized, corresponds with a provisioning rule provided from a data provider, which provisioning rule is a condition for when the data is anonymized; an acquiring process of, if the determining process determines that the request rule corresponds with the provisioning rule, acquiring data corresponding to the provisioning rule; an anonymizing process of anonymizing the data acquired in the acquiring process on the basis of the request rule and issuing anonymized data; and a provisioning process of providing the anonymized data issued in the anonymizing process to the data user terminal.

A non-transitory computer readable storage medium according to the present invention stores a program executed by a computer and the computer executes: a request receiving process of receiving an issuance request from a data user terminal; an acquiring process of acquiring, from an issued data manager, anonymized data that has been previously anonymized at a standard equivalent to a request rule corresponding to the issuance request received in the request receiving process, which request rule is to be used when data is anonymized, or anonymized data that has been previously anonymized at a lower privacy standard than the request rule; an anonymizing process of, on the basis of the request rule, further anonymizing the anonymized data acquired in the acquiring process that has been previously anonymized at the lower privacy standard than the request rule, and issuing doubly anonymized data; and a provisioning process of providing the doubly anonymized data issued in the anonymizing process to the data user terminal, or providing the anonymized data acquired in the acquiring process that has been previously anonymized at the standard equivalent to the request rule to the data user terminal to serve as doubly anonymized data.

Effects of the Invention

According to the present invention, an anonymization system that may provide anonymized data may be provided.

Further, according to the present invention, an issuance device that anonymizes data and a program to be executed at the issuance device may be provided.

PREFERRED MODE FOR CARRYING OUT THE INVENTION

In the following, an embodiment of the present invention will be explained. In the embodiment, as an example of providing anonymized data (anonymous data), the provision of anonymized data of electricity consumption is described.

Figure 1:
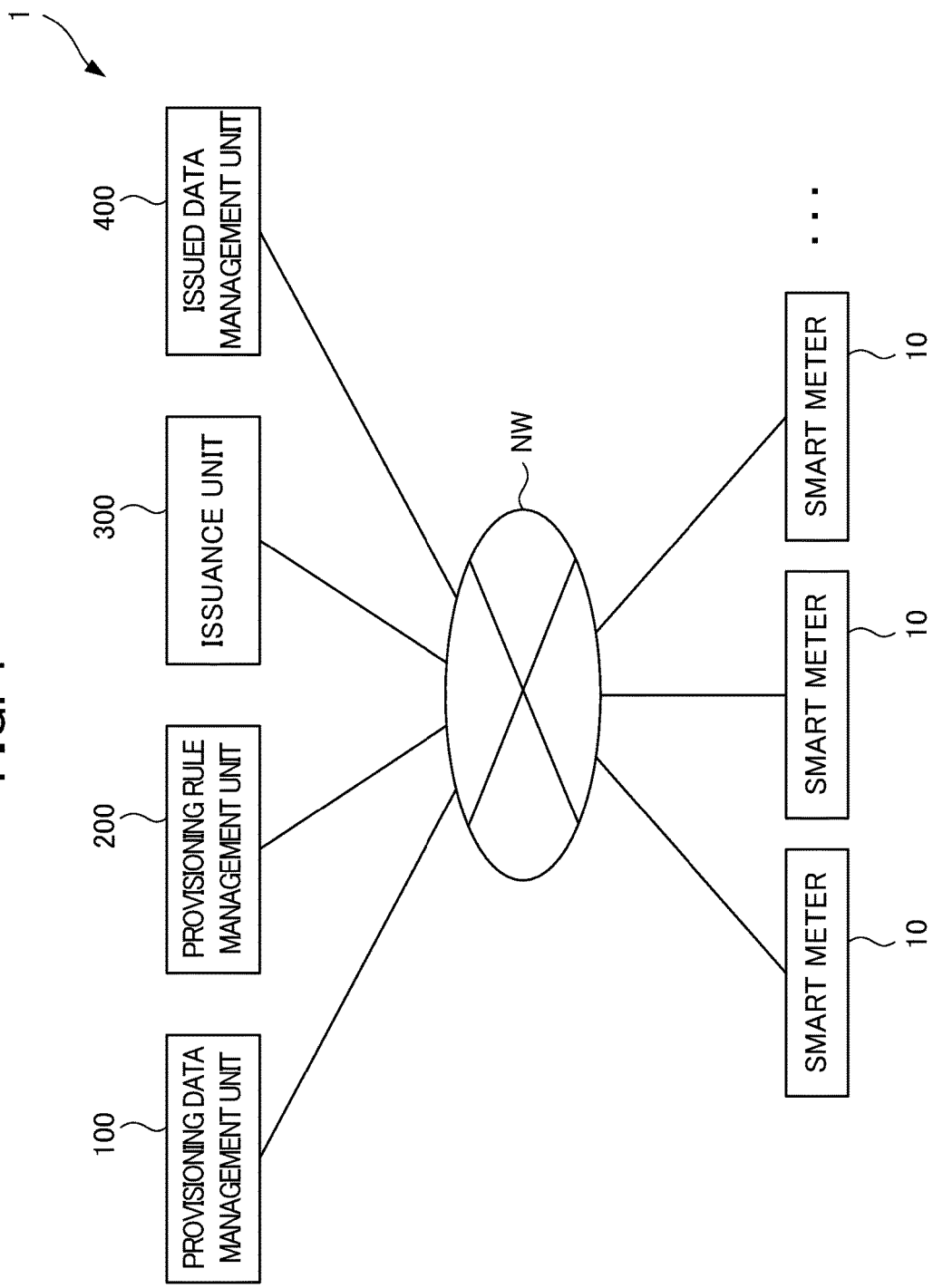
FIG. 1 is a block diagram for describing an anonymization system in accordance with an embodiment.

FIG. 1 is a block diagram for describing an anonymization system 1 in accordance with the embodiment.

The anonymization system 1 is equipped with plural smart meters 10, a provisioning data management unit 100, a provisioning rule management unit 200, an issuance unit 300 and an issued data management unit 400. The plural smart meters 10, the provisioning data management unit 100, the provisioning rule management unit 200, the issuance unit 300 and the issued data management unit 400 are connected to a network NW.

The smart meters 10 are input units for data (information) that is to be the target of anonymization. The smart meters 10 are disposed in households. Each smart meter 10 measures household electricity and sends data produced by the measurements (electricity data) to the provisioning data management unit 100. The smart meter 10 also sends anonymization rules (provisioning rules) to the provisioning data management unit 100. The provisioning rules are to be used when the electricity data produced by electricity measurements is anonymized by the issuance unit 300. The data and provisioning rules sent from the smart meter 10 are associated. The smart meters 10 or the households in which the smart meters 10 are disposed serve as data providers.

The provisioning rules specify a minimum level of anonymization. That is, the provisioning rules are conditions of anonymization. The provisioning rules are set in advance for each smart meter 10 (each household), and can be modified. In the present embodiment, an example is described in which the anonymization utilizes k-member clustering and Gaussian distributions of the data. Therefore, the provisioning rules are, for example, a value of k and a value of a coefficient alpha that is multiplied with the width of the data used when finding a Gaussian distribution.

The provisioning data management unit 100 is, for example, a server. The provisioning data management unit 100 receives the data (electricity data) and provisioning rules, stores the data, and provides the received provisioning rules to the provisioning rule management unit 200. The data is data in which predetermined information is recorded. In the present embodiment, the predetermined information is the electricity measured by the smart meters 10.

Figure 2:
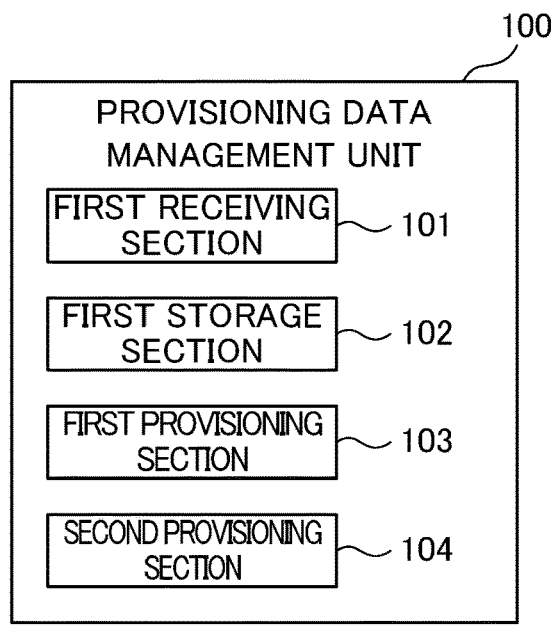
FIG. 2 is a block diagram for describing an example of a provisioning data management unit.

FIG. 2 is a block diagram for describing an example of the provisioning data management unit 100. As a specific example, the provisioning data management unit 100 is equipped with the a first receiving section 101, a first storage section 102, a first provisioning section 103 and a second provisioning section 104.

The first receiving section 101 receives the data and provisioning rules. That is, the first receiving section 101 receives the electricity data produced by electricity measurements and the anonymization provisioning rules, which are sent by the smart meters 10.

The first storage section 102 stores the data received by the first receiving section 101. That is, when data and provisioning rules are received by the first receiving section 101, the first storage section 102 stores data that is provided thereto from the first receiving section 101.

The first provisioning section 103 provides provisioning rules, which are associated with data and received by the first receiving section 101, to the provisioning rule management unit 200. That is, when data and provisioning rules are received by the first receiving section 101, the first provisioning section 103 provides these provisioning rules to the provisioning rule management unit 200. When the first provisioning section 103 provides provisioning rules to the provisioning rule management unit 200, the first provisioning section 103 associates the provisioning rules with the data stored in the first storage section 102.

When there is a data request from the issuance unit 300, the second provisioning section 104 provides data stored in the first storage section 102 to the issuance unit 300. That is, when a data request is made from the issuance unit 300, the second provisioning section 104 reads data corresponding to request rules, which serve as the request, from the first storage section 102 and provides that data to the issuance unit 300.

The provisioning rule management unit 200 is, for example, a server. The provisioning rule management unit 200 stores provisioning rules provided by the provisioning data management unit 100.

Figure 3:
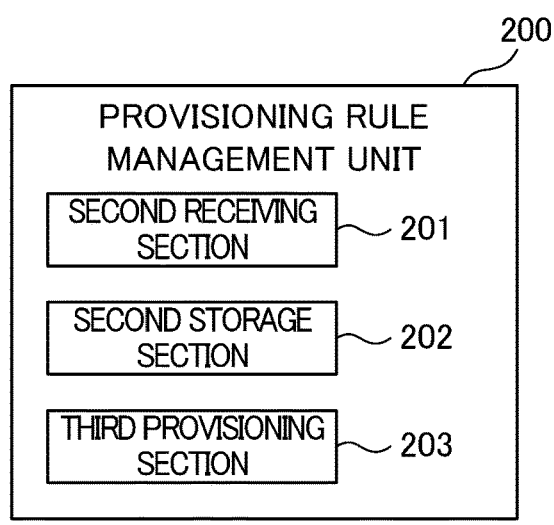
FIG. 3 is a block diagram for describing an example of a provisioning rule management unit.

FIG. 3 is a block diagram for describing an example of the provisioning rule management unit 200. As a specific example, the provisioning rule management unit 200 is equipped with a second receiving section 201, a second storage section 202 and a third provisioning section 203.

The second receiving section 201 receives provisioning rules provided from the provisioning data management unit 100 (from the second provisioning section 104).

The second storage section 202 stores the provisioning rules received by the second receiving section 201. Because data and provisioning rules are associated at the first provisioning section 103, the provisioning rules stored in the second storage section 202 are associated with data stored in the first storage section 102.

The third provisioning section 203 provides provisioning rules stored in the second storage section 202. When there is a request from a data user terminal, the third provisioning section 203 provides the provisioning rules stored in the second storage section 202 to the data user terminal. A data user is a person who wishes to use anonymized data, which is issued consequent to data stored in the first storage section 102 being anonymized. Therefore, the data user may make a judgment as to what provisioning rules the anonymization of the anonymized data they will use should be based on.

The issuance unit 300 is, for example, a server (a computer). When there is an issuance request for anonymized data, if the issuance request is in accord with the provisioning rules stored in the provisioning rule management unit 200, the issuance unit 300 acquires data corresponding to the provisioning rules from the provisioning data management unit 100. The issuance unit 300 anonymizes the acquired data, issues anonymized data, and provides the anonymized data. The issuance unit 300 corresponds to an embodiment of the issuance device of the present invention.

Figure 4:
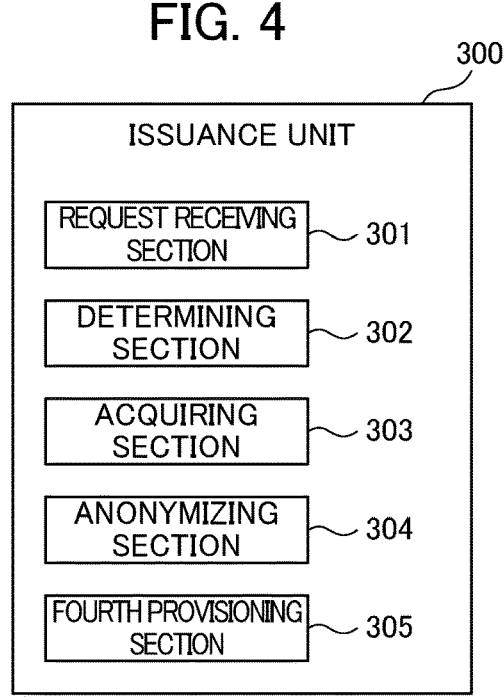
FIG. 4 is a block diagram for describing an example of an issuance unit.

FIG. 4 is a block diagram for describing an example of the issuance unit 300. As a specific example, the issuance unit 300 is equipped with a request receiving section 301, a determining section 302, an acquiring section 303, an anonymizing section 304 and a fourth provisioning section 305.

The request receiving section 301 receives an issuance request for anonymized data from the data user terminal. That is, the data user considers what anonymized data is required by referring to provisioning rules provided from the third provisioning section 203. The provisioning rules provided from the third provisioning section 203 define the minimum conditions of anonymization. Accordingly, the data user considers whether to use anonymized data that is anonymized at the minimum level on the basis of the provisioning rules or to use anonymized data obtained on the basis of provisioning rules that anonymize to a higher level than the provisioning rules provided from the third provisioning section 203. Consequent to this consideration, the data user terminal creates request rules for acquiring the anonymized data that is needed. The request rules define, for example, a value of k and a value of the coefficient alpha.

The issuance request (request rules) created by the data user terminal is received by the request receiving section 301.

If the value of k and the value of the coefficient alpha in the request rules are respectively greater than the value of k and the value of the coefficient alpha defined in the provisioning rules stored at the second storage section 202 (standard values), a Gaussian distribution (existence probability) obtained by the anonymizing section 304, which is described below, has wider tails than a Gaussian distribution (existence probability) obtained from the standard values. That is, if the value of k and the value of the coefficient alpha in the request rules are respectively greater than the standard values, anonymity will be more stringent conditions.

The determining section 302 makes a determination as to whether the request rules correspond to the provisioning rules. The request rules correspond to the issuance request received by the request receiving section 301 and are used when data is anonymized. The provisioning rules are provided by a data provider (and stored in the second storage section 202) and are conditions for when data is anonymized. The determining section 302 makes a determination as to whether the request rules are in accord with the provisioning rules stored in the second storage section 202. That is, the determining section 302 compares the request rules with the provisioning rules stored in the second storage section 202 and makes a determination as to whether the request rules will produce anonymization at a standard equivalent to the provisioning rules or will produce anonymization at a higher standard of anonymity than the provisioning rules.

If it is determined by the determining section 302 that the rules correspond, the acquiring section 303 acquires data corresponding to the provisioning rules (and the request rules) from the provisioning data management unit 100. That is, if it is determined by the determining section 302 that the request rules are in accord with the provisioning rules, then in order to issue the anonymized data requested by the data user terminal, the acquiring section 303 acquires the data corresponding to the request rules (the provisioning rules) requested by the data user terminal from the first storage section 102.

In the case in which the request rules are determined to be in accord with the provisioning rules by the determining section 302, the anonymizing section 304 anonymizes the data acquired by the acquiring section 303. The anonymizing section 304 anonymizes the data by executing the following procedures 1 to 3 in this order.

First, in procedure 1, the anonymizing section 304 creates plural clusters containing predetermined quantities of data on the basis of the data acquired from the provisioning data management unit 100. The predetermined quantities of data are based on the value of k specified in the request rules. That is, the anonymizing section 304 performs clustering such that k items of data are contained in each cluster. An element of the anonymizing section 304 that carries out procedure 1 may be referred to as "the cluster creation section".

Then, in procedure 2, the anonymizing section 304 creates respective Gaussian distributions of the plural clusters. That is, the anonymizing section 304 calculates a width for creating a Gaussian distribution of each cluster from a maximum value and a minimum value of the data contained in the cluster. The anonymizing section 304 calculates a standard deviation sigma$^2$ of the Gaussian distribution on the basis of a multiplication of the calculated width with the coefficient alpha specified in the request rules. That is, the standard deviation is found from sigma$^2$=(alpha·width)$^2$.

The anonymizing section 304 creates the Gaussian distribution on the basis of the following mathematical expression (1). An element of the anonymizing section 304 that carries out procedure 2 may be referred to as "the Gaussian distribution creation section".

$$F(x) = \frac{1}{n}\sum_{k=1}^{n} \frac{1}{\sqrt{2\pi\sigma^2}} \exp\left\{-\frac{(x-\mu)^2}{2\sigma^2}\right\}$$ [Math. 1]

The symbol n represents the number of clusters and the symbol μ represents the mean value of the data contained in a cluster.

Figure 5:
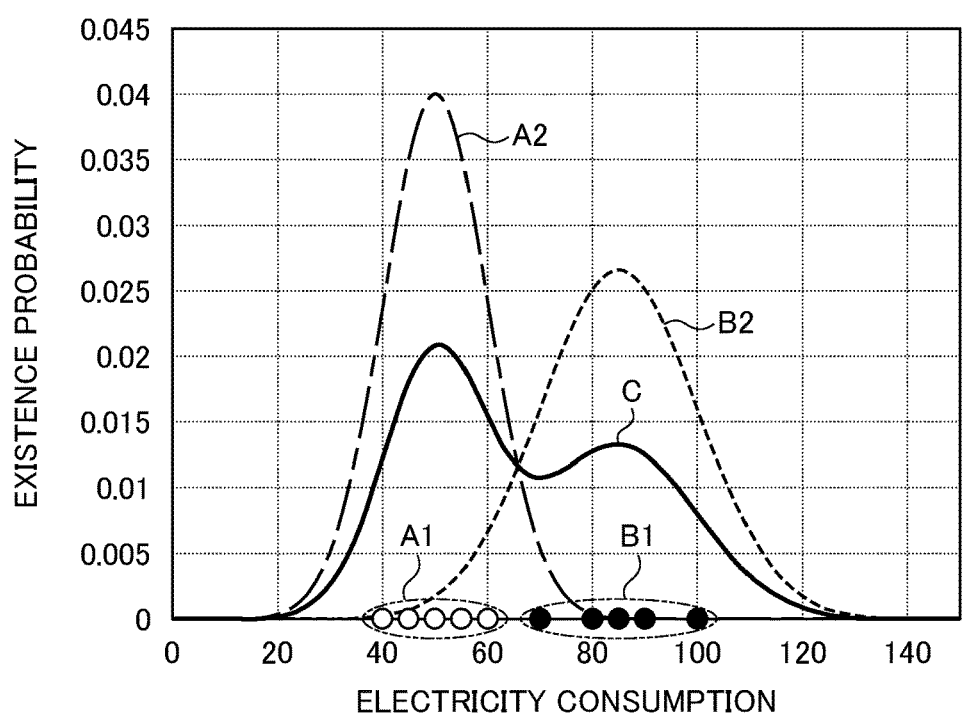
FIG. 5 is a diagram for describing an example of anonymization processing by an anonymizing section.

Then, in procedure 3, the anonymizing section 304 adds together the created Gaussian distributions and performs a scale conversion to make the area of the added distribution equal to one. FIG. 5 is a diagram for describing an example of the anonymization processing by the anonymizing section 304. As illustrated in the example in FIG. 5, by performing procedures 1 and 2, the anonymizing section 304 obtains a Gaussian distribution A2 for a cluster A1 and obtains a Gaussian distribution B2 for a cluster B1. In procedure 3, the anonymizing section 304 adds the Gaussian distributions A2 and B2 and converts the scale such that the area of the added Gaussian distribution is one, thus acquiring an existence probability C. An element of the anonymizing section 304 that carries out procedure 3 may be referred to as "the scale conversion section".

Figure 6:
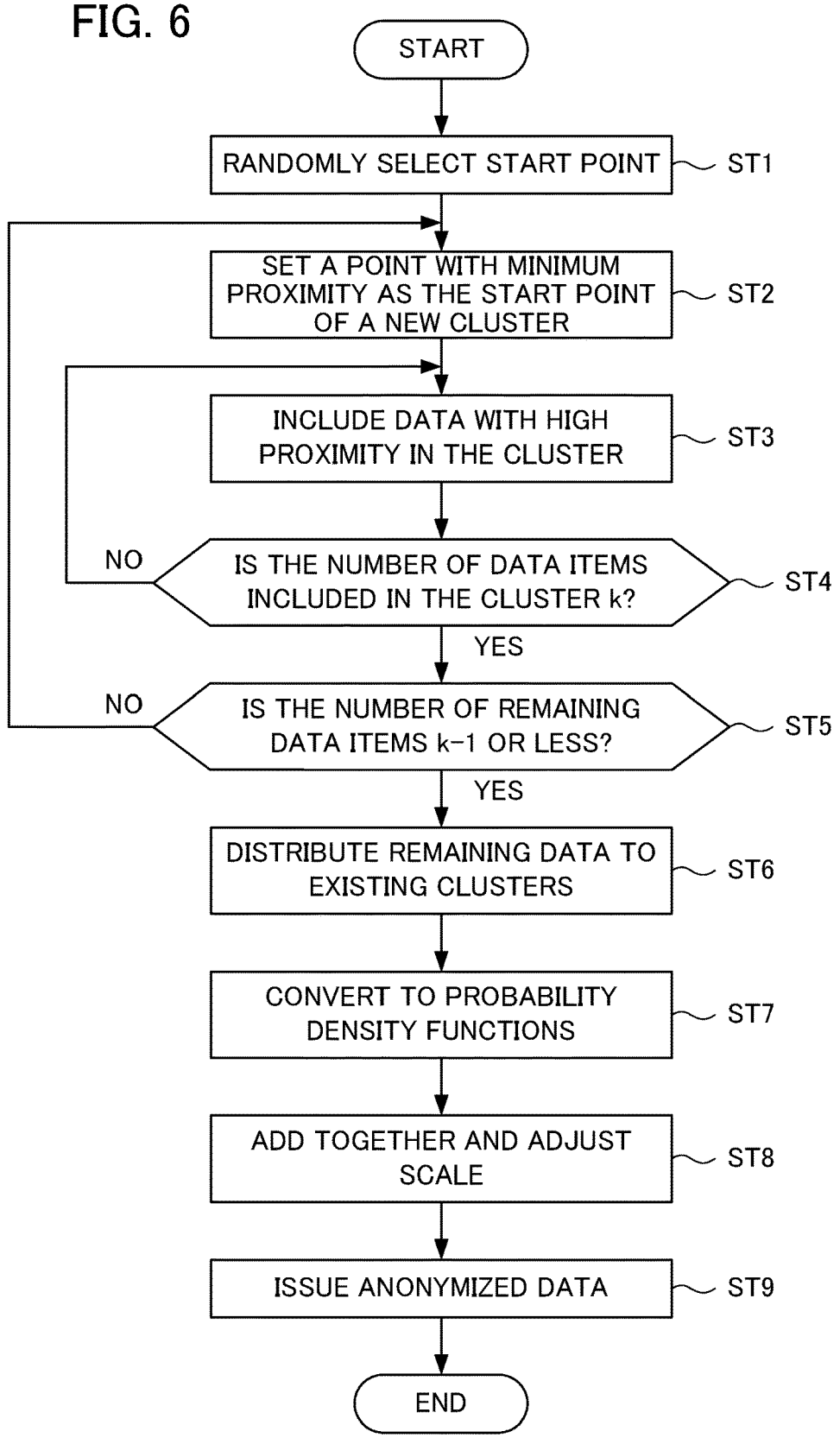
FIG. 6 is a flowchart for describing a detailed example of a processing flow of the anonymizing section.

Now, details of the flow of processing of the anonymizing section 304 are described. FIG. 6 is a flowchart for describing a detailed example of the processing flow of the anonymizing section 304.

In step ST1, the anonymizing section 304 randomly selects the start point of a cluster from the plural data acquired by the acquiring section 303.

In step ST2, the anonymizing section 304 sets a point with a minimum degree of proximity to the start point selected in step ST1 as the start point of a new cluster.

In step ST3, the anonymizing section 304 includes a data item with a high degree of proximity to the start point selected in step ST1 or ST2 in the cluster.

In step ST4, the anonymizing section 304 makes a determination as to whether the number of data items included in the cluster by step ST3 has reached k. If the data quantity is not k ("NO"), the anonymizing section 304 returns to the processing of step ST3. If the data quantity has reached k ("YES"), the anonymizing section 304 advances to the processing of step ST5.

In step ST5, the anonymizing section 304 makes a determination as to whether the number of remaining data items is k−1 or less. If the remaining data quantity is not k−1 or less ("NO"), the anonymizing section 304 returns to the processing of step ST2. If the remaining data quantity is k−1 or less ("YES"), the anonymizing section 304 advances to the processing of step ST6.

In step ST6, the anonymizing section 304 distributes any data not contained in a cluster into the existing clusters. Thus, all of the data is included in clusters.

In step ST7, the anonymizing section 304 finds a Gaussian distribution for each cluster and hence converts the Gaussian distribution to an existence probability.

In step ST8, the anonymizing section 304 adds together the respective Gaussian distributions and adjusts the scale such that the area of the combined Gaussian distribution is one.

In step ST9, the anonymizing section 304 issues the existence probability whose scale has been adjusted as the anonymized data.

The fourth provisioning section 305 provides the anonymized data that has been anonymized by the anonymizing section 304 to the data user terminal. The fourth provisioning section 305 corresponds to an embodiment of the "provisioning section" of the present invention. The fourth provisioning section 305 also provides the anonymized data to the issued data management unit 400.

Figure 7:
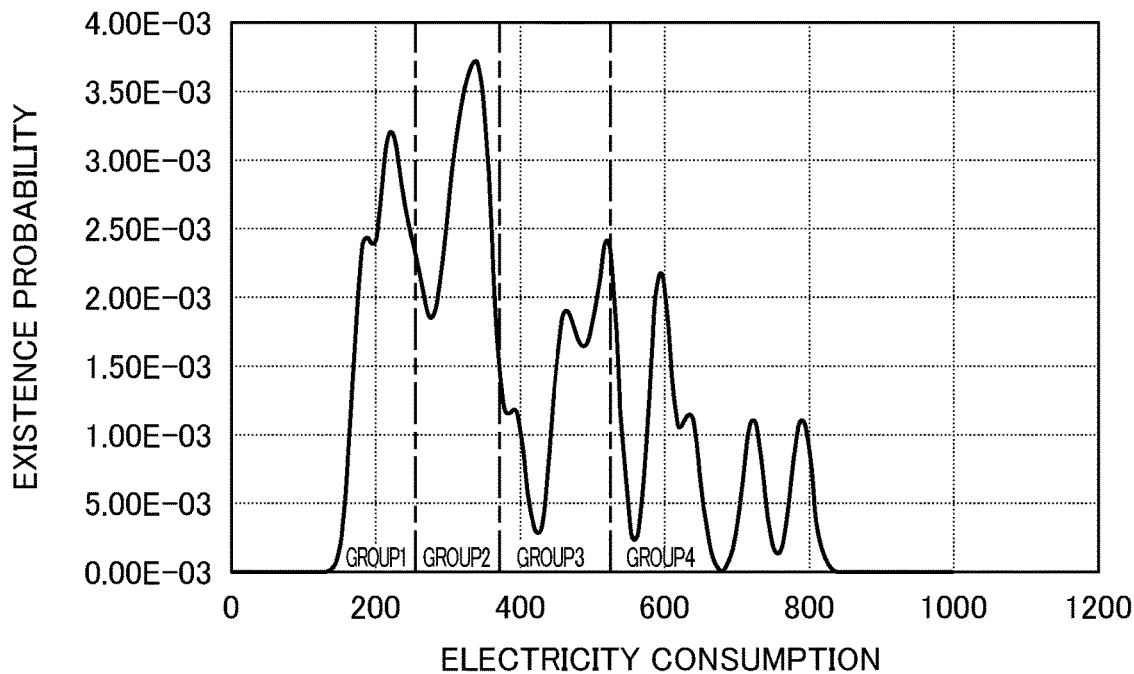
FIG. 7 is a diagram for describing an example of anonymized data provided by the fourth provisioning section.

FIG. 7 is a diagram for describing an example of anonymized data provided by a fourth provisioning section 305. In FIG. 7, anonymized data of electricity consumption of 50 households is issued. The data user terminal is provided by the fourth provisioning section 305 with the anonymized data illustrated by the example in FIG. 7. As an example, the data user terminal divides the anonymized data into four groups based on electricity consumption and specifies different electricity savings for the groups. This specification is, for example, a reduction of 75 Wh for households consuming less than 250 Wh, a reduction of 150 Wh for households between 251 and 390 Wh, a reduction of 225 Wh for households between 391 and 530 Wh, and a reduction of 257 Wh for households above 531 Wh. The data user terminal distributes the anonymized data and the above-described specification to the households, encouraging the households to save electricity in accordance with the electricity consumption of each household.

The issuance unit 300 (for example, the anonymizing section 304) may record with the anonymized data information about: which data providers (for example, ID numbers or the like) provided the information that is the basis for the anonymized data; by what anonymization method the anonymization is performed; who performs the processing (an issuer ID or the like); and what the level of precision is (a hash key). This information may be recorded in a similar manner to publicly known digital watermarking techniques.

That is, when electricity data is anonymized, even given the same strength of anonymization, there are plural items to be anonymized; which is to say, there are plural methods of generalization. If this is made systematic, a desired code may be recorded. For example, if the provisioning rules are for 2-anonymity and the request rules are for 3-anonymity, the issuance unit first creates 2-anonymity data on the basis of the electricity data, and then the issuance unit creates 3-anonymity data on the basis of the 2-anonymity data. When 3-anonymity data is created from 2-anonymity data, plural fields are being anonymized. For k-anonymity, groups of k are created. If, for example, groups simply created in order from a first item are represented by "0" (zero) and a last group created non-successively from subsequent data is represented by "1", 0/1 information may be embedded in the anonymized data. If 0/1 information is embedded in the anonymized data as in this example, the watermarking information is not just simple anonymized information, and meta information may be embedded.

The issued data management unit 400 is, for example, a server. The issued data management unit 400 stores anonymized data issued by the issuance unit 300.

Figure 8:
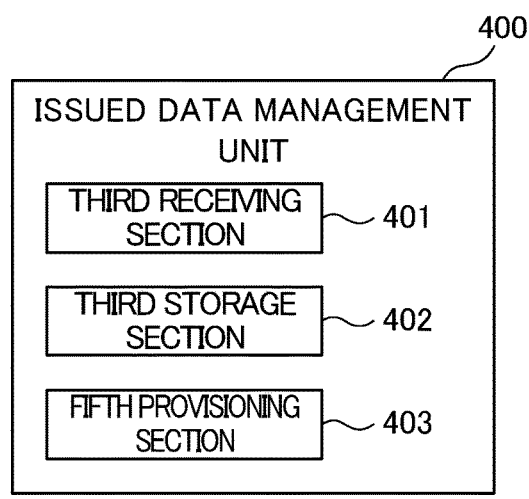
FIG. 8 is a block diagram for describing an example of an issued data management unit.

FIG. 8 is a block diagram for describing an example of the issued data management unit 400. As a specific example, the issued data management unit 400 is equipped with a third receiving section 401, a third storage section 402 and a fifth provisioning section 403.

The third receiving section 401 receives anonymized data provided by the fourth provisioning section 305.

The third storage section 402 stores the anonymized data received by the third receiving section 401.

When there is a request from the issuance unit 300, the fifth provisioning section 403 reads the anonymized data stored in the third storage section 402 and provides the anonymized data to the issuance unit 300.

In this embodiment, the issuance unit 300 reads the anonymized data stored in the issued data management unit 400, further anonymizes the anonymized data, and issues doubly anonymized data.

For example, the following operations are carried out at the issuance unit 300. The request receiving section 301 receives a request for doubly anonymized data. If the determining section 302 determines that the request rules are in accord with the provisioning rules, the acquiring section 303 makes a request to the issued data management unit 400 to read anonymized data corresponding to the rules, and acquires the anonymized data that is provided from the fifth provisioning section 403. On the basis of the anonymized data and the request rules, the anonymizing section 304 issues doubly anonymized data. The fourth provisioning section 305 provides the doubly anonymized data to the data user terminal.

Alternatively, as a different example, the following operations may be carried out at the issuance unit 300. The request receiving section 301 receives an issuance request from a data user terminal. The acquiring section 303 acquires from the issued data management unit 400 anonymized data that corresponds to the issuance request received by the request receiving section 301 and that has previously been anonymized at a standard equivalent to the request rules to be used when anonymizing the data. Alternatively, the acquiring section 303 acquires from the issued data management unit 400 anonymized data that has previously been anonymized at a lower privacy standard than the request rules. If anonymized data that has been anonymized at the standard equivalent to the request rules and anonymized data that has been anonymized at the lower privacy standard than the request rules are both stored in the issued data management unit 400, it is preferable for the acquiring section 303 to preferentially acquire the anonymized data that has been anonymized at the standard equivalent to the request rules. A processing load on the anonymizing section 304 is moderated by this preferential acquisition. For anonymized data acquired by the acquiring section 303 that has previously been anonymized at a lower privacy standard than the request rules, the anonymizing section 304 further anonymizes the anonymized data on the basis of the request rules and issues doubly anonymized data. The fourth provisioning section 305 provides the doubly anonymized data issued by the anonymizing section 304 to the data user terminal. Alternatively, the fourth provisioning section 305 provides anonymized data acquired by the acquiring section 303 that has previously been anonymized at the standard equivalent to the request rules to the data user terminal to serve as the doubly anonymized data.

Now, a flow of processing of the anonymization system 1 is described.

—Provision of Electricity Data—

First, a situation in which the smart meters 10 are providing provisioning rules and electricity data is described.

Each smart meter 10 measures electricity in a household. The smart meter 10 provides provisioning rules and electricity data to the provisioning data management unit 100. The provisioning data management unit 100 stores the electricity data received from the smart meter 10. The provisioning data management unit 100 stores the provisioning rules received from the smart meters 10 in the provisioning rule management unit 200. Thus, the provisioning rule management unit 200 stores the provisioning rules.

—Issuance of Anonymized Data—

Now, a situation in which anonymized data is issued is described. When there is an acquisition request from a data user terminal for provisioning rules for target data, the provisioning rule management unit 200 provides the corresponding provisioning rules to the data user terminal. When there is an issuance request for target electricity data (a set of electricity data for households in a designated area) with request rules specified by a data user terminal, the issuance unit 300 compares the provisioning rules stored in the provisioning rule management unit 200 with the request rules. If the result of the comparison is that the request rules are in accord with the provisioning rules, the issuance unit 300 checks whether or not anonymized data for the target electricity data is stored in the issued data management unit 400.

If anonymized data of the target electricity data is not stored in the issued data management unit 400, the issuance unit 300 acquires the electricity data from the provisioning data management unit 100 and anonymizes the electricity data in accordance with the request rules. The issuance unit 300 issues the anonymized electricity data (anonymized data) to the issued data management unit 400 and provides the anonymized data to the data user terminal.

On the other hand, if anonymized data of the target electricity data is stored in the issued data management unit 400, the issuance unit 300 checks whether or not the stored anonymized data is in accord with the request rules. If the anonymized data stored in the issued data management unit 400 is in accord with the request rules, the issuance unit 300 provides the anonymized data to the data user terminal. However, if the anonymized data stored in the issued data management unit 400 is not in accord with the request rules, the issuance unit 300 further anonymizes the anonymized data stored in the issued data management unit 400 and issues doubly anonymized data. Because the anonymized data stored in the issued data management unit 400 is checked and doubly anonymized data is issued on the basis of the anonymized data, a situation in which data whose provisioning rules are at a lower privacy standard may be inferred from plural issues of anonymized data can be avoided. The issuance unit 300 provides the doubly anonymized data to the issued data management unit 400 and provides the doubly anonymized data to the data user terminal.

The issuance unit 300 may be provided with a program that executes a request receiving step, a determining step, an acquiring step, an anonymizing step and a provisioning step as described below.

The request receiving step receives an issuance request from a data user.

The determining step makes a determination as to whether request rules that correspond to the issuance request received in the request receiving step and are to be used when anonymizing data correspond with the provisioning rules received from the data providers to be conditions for when the data is anonymized.

If it is determined in the determining step that the rules correspond, the acquiring step acquires data corresponding to the provisioning rules.

The anonymizing step anonymizes the data acquired in the acquiring step on the basis of the request rules and issues the anonymized data.

The provisioning step provides the anonymized data issued in the anonymizing step to the data user.

Further, the issuance unit 300 may be provided with a program that executes a request receiving step, an acquiring step, an anonymizing step and a provisioning step as described below.

The request receiving step receives an issuance request from a data user.

The acquiring step acquires, from the issued data management unit 400, either anonymized data that has been previously anonymized at a standard equivalent to the request rules corresponding to the issuance request received in the request receiving step, which are to be used when anonymizing data, or anonymized data that has been previously anonymized at a lower privacy standard than the request rules.

The anonymizing step further anonymizes the anonymized data acquired in the acquiring step that has been previously anonymized at the lower privacy standard than the request rules on the basis of the request rules, and issues doubly anonymized data.

The provisioning step either provides the doubly anonymized data issued in the anonymizing step to the data user, or provides the anonymized data acquired in the acquiring step that has already been anonymized at the standard equivalent to the request rules to the data user terminal to serve as doubly anonymized data.

A program may be stored in a storage medium. The storage medium is, for example, a flexible disc, an optical disc, a hard disk, a memory or the like.

According to the anonymization system 1 as described above, anonymized data sought by a data user may be provided to a terminal at the data user.

Because the anonymization system 1 provides rules that are conditions for when data is anonymized to the data user in advance, the data user may consider whether or not the anonymized data that is sought can be obtained.

Because the anonymization system 1 makes a determination at the issuance unit 300 as to whether the request rules requested by a data user terminal are in accord with the provisioning rules that are conditions for anonymizing the data, a situation in which anonymized data that is anonymized at a lower privacy standard is inappropriately provided to a data user terminal may be avoided.

The anonymization system 1 may issue anonymized data by utilizing k-member clustering and Gaussian distributions.

Because the anonymization system 1 issues doubly anonymized data by further anonymizing previously issued anonymized data, failures of anonymization may be prevented.

Conventionally, if anonymized data (first anonymized data) is created from electricity data at a certain standard and then anonymized data (second anonymized data) is created from the same electricity data at the same standard, then even if the anonymities (the k-anonymities) of the first anonymized data and the second anonymized data are different, there is a possibility of anonymization failing if the first anonymized data is compared with the second anonymized data.

Moreover, conventionally, if anonymized data (third anonymized data) is created from electricity data at a certain standard and then anonymized data (fourth anonymized data) is created from the same electricity data at a different standard, then even if the anonymities (the k-anonymities and l-diversities) of the third anonymized data and the fourth anonymized data are different, there is a possibility of anonymization failing if the third anonymized data is compared with the fourth anonymized data.

For example, data relating to electricity consumptions of households residing in a particular area is represented as illustrated in Table 1.

TABLE 1

| ADDRESS | HOUSEHOLD POPULATION | ELECTRICITY CONSUMPTION |
| --- | --- | --- |
| 1, A STREET | 4 | 450 |
| 1, A STREET | 3 | 450 |
| 2, B STREET | 4 | 390 |
| 2, B STREET | 3 | 390 |

If k-anonymization with k=2 is applied to the data shown in Table 1, for example, the anonymized data shown in Table 2 is obtained.

TABLE 2

| ADDRESS | HOUSEHOLD POPULATION | ELECTRICITY CONSUMPTION |
| --- | --- | --- |
| 1, A STREET | <5 | 450 |
| 1, A STREET | <5 | 450 |
| 2, B STREET | <5 | 390 |
| 2, B STREET | <5 | 390 |

If anonymization with an l-diversity of l=2 is applied to the data shown in Table 1, for example, the anonymized data shown in Table 3 is obtained.

TABLE 3

| ADDRESS | HOUSEHOLD POPULATION | ELECTRICITY CONSUMPTION |
| --- | --- | --- |
| * | 4 | 450 |
| * | 3 | 450 |
| * | 4 | 390 |
| * | 3 | 390 |

If the anonymized data shown in Table 2 is compared with the anonymized data shown in Table 3, the data shown in Table 1 can be obtained.

Accordingly, in the present embodiment the following processes (1) to (3) are executed.
(1) All anonymized data that has been issued previously is stored.
(2) If there is data in the stored anonymized data that has been anonymized at a standard equivalent to the request rules contained in an issuance request, the corresponding anonymized data is read and issued. The scope of searching is not limited to anonymized data that has been issued under a particular standard but includes all anonymized data that has been previously stored.
(3) If there is no data in the stored anonymized data that has been anonymized at a standard equivalent to the request rules contained in the issuance request, doubly anonymized data that is based on stored anonymized data and satisfies the request rules is issued.

For example, if the stored anonymized data includes the anonymized data shown in Table 2, then if further anonymization based on an l-diversity with l=2 is applied to the anonymized data shown in Table 2, the doubly anonymized data shown in Table 4 is obtained. Even if the anonymized data shown in Table 2 is compared with the doubly anonymized data shown in Table 4, only the data shown in Table 2 can be obtained; only anonymized data in accordance with the provisioning rules of the data providers can be obtained. Thus, the anonymization system 1 may prevent a situation in which anonymized data at a lower privacy standard can be inferred from plural issues of anonymized data.

TABLE 4

| ADDRESS | HOUSEHOLD POPULATION | ELECTRICITY CONSUMPTION |
|---|---|---|
| * | <5 | 450 |
| * | <5 | 450 |
| * | <5 | 390 |
| * | <5 | 390 |

In a variant example, the issuance unit 300 firstly creates anonymized data under the provisioning rules of data providers (the minimum permitted privacy standard). Hence, by reference to this anonymized data, the issuance unit 300 creates anonymized data in accordance with the request rules contained in issuance requests and provides the anonymized data to data user terminals. Therefore, the anonymized data provided to the data user terminals is in accord with the rules of the data providers.

In the embodiment described above, an example is described in which the provisioning data management unit 100 and the provisioning rule management unit 200 are provided separately. However, the present invention is not limited by this example. For example, a provisioning data management unit and a provisioning rule management unit may be implemented by a single server.

In the embodiment described above, an example is described in which the issuance unit 300 and the issued data management unit 400 are provided separately. However, the present invention is not limited by this example. For example, an issuance unit and an issued data management unit may be implemented by a single server.

In the embodiment described above, an example is described in which electricity consumptions are anonymized. However, the present invention is not limited by this example. The information recorded in the data that is the target of anonymization may be any of various kinds of information such as, for example, medical information (medical records), travel information on public transport systems (travel histories), item purchase information (shopping histories) and so forth.

EXPLANATION OF REFERENCE NUMERALS

1 Anonymization system
100 Provisioning data management unit
200 Provisioning rule management unit
300 Issuance unit
301 Request receiving section
302 Determining Section
303 Acquiring section
304 Anonymizing section
305 Fourth provisioning section
400 Issued data management unit

The invention claimed is:
1. An anonymization system comprising:
a plurality of data provision devices that provide anonymization target data in which predetermined information is recorded, and a provisioning rule serving as a condition for when the data is anonymized, by associating the data with the provisioning rule;
a provisioning data manager that receives the data in which predetermined information is recorded with its associated provisioning rule, from each of the plurality of data provision devices, that stores the data, and that provides the provisioning rule corresponding to the stored data;
a provisioning rule manager that stores the provisioning rule provided by the provisioning data manager; and
an issuer that, when an issuance request for anonymized data in which the data is anonymized is received and if the issuance request is in accord with the provisioning rule stored at the provisioning rule manager, acquires data corresponding to the provisioning rule from the provisioning data manager, anonymizes the acquired data, issues anonymized data, and provides the anonymized data.

2. The anonymization system according to claim 1, wherein the issuer comprises:
a request receiving section that receives the issuance request, in relation to the data provided from the plurality of data provision devices;
a determining section that makes a determination as to whether a request rule corresponding to the issuance request received by the request receiving section, which request rule is to be used when the data is anonymized, corresponds with the provisioning rule stored at the provisioning rule manager;
an acquiring section that, if the determining section determines that the request rule corresponds with the provisioning rule, acquires the data corresponding to the provisioning rule from the provisioning data manager;
an anonymizing section that anonymizes the data acquired by the acquiring section based on the request rule, and issues the anonymized data; and
a provisioning section that provides the anonymized data issued by the anonymizing section.

3. The anonymization system according to claim 2, wherein the anonymizing section issues the anonymized data by:
creating a plurality of clusters containing predetermined quantities of data based on of the data acquired by the acquiring section;
creating respective Gaussian distributions of the plurality of clusters; and
adding together the created Gaussian distributions and converting scale such that an area of the combined distribution is one.

4. The anonymization system according to claim 1, further comprising an issued data manager that stores the anonymized data issued by the issuer, wherein the issuer reads the anonymized data stored at the issued data manager, further anonymizes the anonymized data, and issues doubly anonymized data.

5. An issuance device comprising:
a request receiving section that receives an issuance request from a data user terminal, in relation to data provided from a plurality of data provision devices, wherein each of the plurality of data provision devices provides anonymization target data in which predetermined information is recorded, and a provisioning rule serving as a condition for when the data is anonymized, by associating the data with the provisioning rule;
a determining section that makes a determination as to whether a request rule corresponding to the issuance request received by the request receiving section, which request rule is to be used when data is anonymized, corresponds with a provisioning rule provided from the data provision devices;

an acquiring section that, if the determining section determines that the request rule corresponds with the provisioning rule, acquires data corresponding to the provisioning rule;

an anonymizing section that anonymizes the data acquired by the acquiring section based on the request rule, and issues anonymized data; and a provisioning section that provides the anonymized data issued by the anonymizing section to the data user terminal.

6. An issuance device comprising:

a request receiving section that receives an issuance request from a data user terminal, in relation to data provided from a plurality of data provision devices, wherein each of the plurality of data provision devices provides anonymization target data in which predetermined information is recorded, and a provisioning rule serving as a condition for when the data is anonymized, by associating the data with the provisioning rule;

an acquiring section that acquires, from an issued data manager, (i) first anonymized data comprising data received from the plurality of data provision devices that has been previously anonymized at a standard equivalent to a request rule corresponding to the issuance request received by the request receiving section, which request rule is to be used when data is anonymized, or (ii) second anonymized data comprising data received from the plurality of data provision devices that has been previously anonymized at a lower privacy standard than the request rule;

an anonymizing section that, based on the request rule, further anonymizes the second anonymized data acquired by the acquiring section, and issues doubly anonymized data; and a provisioning section that provides, to the data user terminal to serve as doubly anonymized data, (i) the doubly anonymized data issued by the anonymizing section, or (ii) the first anonymized data acquired by the acquiring section.

7. A non-transitory computer readable storage medium having stored therein a program executable by a computer, the program executing:

a request receiving process of receiving an issuance request from a data user terminal, in relation to data provided from a plurality of data provision devices, wherein each of the plurality of data provision devices provides anonymization target data in which predetermined information is recorded, and a provisioning rule serving as a condition for when the data is anonymized, by associating the data with the provisioning rule;

a determining process of making a determination as to whether a request rule corresponding to the issuance request received in the request receiving process, which request rule is to be used when data is anonymized, corresponds with a provisioning rule provided from the data provision devices;

an acquiring process of, if the determining process determines that the request rule corresponds with the provisioning rule, acquiring data corresponding to the provisioning rule;

an anonymizing process of anonymizing the data acquired in the acquiring process based on the request rule, and issuing anonymized data; and a provisioning process of providing the anonymized data issued in the anonymizing process to the data user terminal.

8. A non-transitory computer readable storage medium having stored therein a program executable by a computer, the program executing:

a request receiving process of receiving an issuance request from a data user terminal, in relation to data provided from a plurality of data provision devices, wherein each of the plurality of data provision devices provides anonymization target data in which predetermined information is recorded, and a provisioning rule serving as a condition for when the data is anonymized, by associating the data with the provisioning rule;

an acquiring process of acquiring, from an issued data manager, (i) first anonymized data comprising data received from the plurality of data provision devices that has been previously anonymized at a standard equivalent to a request rule corresponding to the issuance request received in the request receiving process, which request rule is to be used when data is anonymized, or (ii) second anonymized data comprising data received from the plurality of data provision devices that has been previously anonymized at a lower privacy standard than the request rule;

an anonymizing process of, based on the request rule, further anonymizing the second anonymized data acquired in the acquiring process, and issuing doubly anonymized data; and a provisioning process of providing, to the data user terminal to serve as doubly anonymized data, (i) the doubly anonymized data issued in the anonymizing process, or (ii) the first anonymized data acquired in the acquiring process.

* * * * *